J. KATZENBERG.

Suspenders.

No. 9,435. Reissued Oct. 26, 1880.

WITNESSES:

H. B. Brown

Amos W. Clark

INVENTOR:

J. Katzenberg

BY [illegible]

ATTORNEYS.

N. PETERS, PHOTO-LITHOGRAPHER, WASHINGTON, D. C.

UNITED STATES PATENT OFFICE.

JACOB KATZENBERG, OF NEW YORK, N. Y.

SUSPENDERS.

SPECIFICATION forming part of Reissued Letters Patent No. 9,435, dated October 26, 1880.

Original No. 229,141, dated June 22, 1880. Application for reissue filed September 22, 1880.

*To all whom it may concern:*

Be it known that I, JACOB KATZENBERG, of the city, county, and State of New York, have invented a new and useful Improvement in Suspenders; and I do hereby declare that the following is a full, clear, and exact description of the same, reference being had to the accompanying drawings, forming part of this specification, in which—

Figure 1:
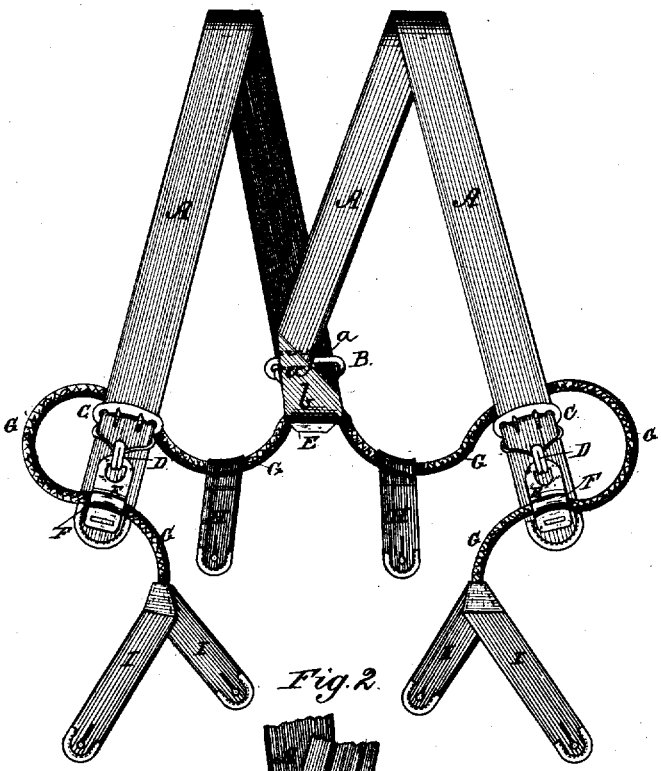
Figure 2:
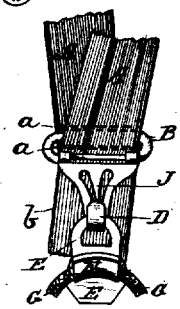

Figure 1 represents the suspenders in position for use. Fig. 2 represents a portion of the rear part of the suspenders.

My invention is an improvement in the class of suspenders in which a cord is combined with shoulder-straps by means of pulleys or sliding attachments, so as to allow the free movement of the button-pieces, and thereby accommodate the movements of the body of the wearer.

My invention consists in the construction and combination of parts, as hereinafter described and claimed, whereby the shoulder-straps are fastened together, so as to secure the rear buckle clasp or slide, and provided with an extension which forms a pad for the latter; also whereby the shoulder-straps may be disconnected in front and at the back, thereby leaving the button-pieces attached to the pantaloons; also whereby the suspenders may be made more cheaply than others of their class.

The letters A A represent the shoulder-straps, which are made in one piece or web that is doubled or folded at the middle of its length, the under ply being turned so that the right side of the material is outward. The two straps A A are secured together a short distance above such fold by means of two transverse parallel rows of stitches, *a a*, and the ring or loop of the rear clasp or buckle, B, is confined between the straps and the rows of stitches, as shown.

The doubled portion *b* of the web, which extends below the lower row of stitches *a*, constitutes or subserves the office of a pad for protecting the shirt of the person wearing the suspenders from contact with, and injury by, the clasp or buckle B, and also for preventing discomfort to the wearer by the pressure or friction of the clasp incident to use. This construction is very important in respect to the economy or cheapness of the suspenders and the ease and comfort of the wearer and protection of his under-clothing.

To the ends of the strap A are attached buckles or clasps C, as shown in Fig. 1. The buckles or clasps B C C are made with hooks D, upon which are hooked plates E. The plates E have holes in their upper ends to receive the hooks D, so that they may swing freely upon the said hooks. Upon the forward side of the plates E are formed wide hooks F, to receive the cord G, and which are curved, as shown, to allow the said cord G to slide through them freely and smoothly.

H are the rear button-pieces, the upper ends of which are looped or folded over the cord G. To the spread-out ends of the cord G are attached the forward button-pieces, I.

With this construction, when it is desired to disconnect the pantaloons and the suspenders without removing the shoulder-straps A from the shoulders of the wearer, the hook-plates E F can be readily unhooked from the hooks D of the buckles or clasps B C, leaving the hook-plates E F, the cord G, and the button-pieces H I connected with the pantaloons.

The hook-plates E F can be readily hooked upon the hooks B C C, when desired. The hooks B C C may be made with a spring, J, to prevent the hook-plates E F from becoming accidentally detached.

The various parts of the suspenders can move easily upon each other to accommodate themselves to the tension of the different parts of the pantaloons caused by the movements of the body of the wearer.

What I claim as new is—

1. In the manufacture of suspenders, the shoulder-straps, fastened together at the point *a*, and having the extension *b* below the same, as and for the purpose specified.

2. The shoulder-straps A A, formed of a single piece or web, which is folded or doubled at the middle of its length and fastened together above the fold, for the purpose of securing the rear buckle or clasp and forming a pad for the same, as shown and described.

3. The combination of the rear buckle or clasp, B, with the shoulder-straps A A, fastened together at *a a*, and having the extension forming a pad, *b*, as shown and described.

4. As an improved article of manufacture, suspenders constructed, substantially as herein shown and described, of the shoulder-straps A, made in one piece, folded together at the center, and having hook buckles or clasps B C C, the plates E, having wide curved hooks or runners F, and the single cord G, having button-pieces H upon the opposite sides of its center and button-pieces I at its ends, as set forth.

JACOB KATZENBERG.

Witnesses:

EDWARD GOTTSCHALL,

JOSEPH KOCH.